United States Patent

[11] 3,588,509

| [72] | Inventors | Kazuo Yanagishita; Takanori Kano, Amagasaki, Japan |
|---|---|---|
| [21] | Appl. No. | 748,050 |
| [22] | Filed | July 26, 1968 |
| [45] | Patented | June 28, 1971 |
| [73] | Assignee | Mitsnbishi Denki Kabushiki Kaisha Tokyo, Japan |
| [32] | Priority | Aug. 4, 1967 |
| [33] | | Japan |
| [31] | | 42/50141 |

[54] NEUTRON MONOCHROMATOR
4 Claims, 6 Drawing Figs.
[52] U.S. Cl. .................................... 250/845, 250/105, 250/108
[51] Int. Cl. ................................................ G21g 3/04
[50] Field of Search .......................................... 250/84.5, 83.1, 108, 105

[56] References Cited
UNITED STATES PATENTS
| 2,991,367 | 7/1961 | Thayer et al. ................. | 250/84.5 |
| 3,126,481 | 3/1964 | Whittier ....................... | 250/83.1 |

*Primary Examiner*—Walter Stolwein
*Assistant Examiner*—Davis L. Willis
*Attorneys*—Robert E. Burns and Emmanuel J. Lobato ABSTRACT: A beam of neutrons passes through an entrance hole bored in a stationary shield block and is reflected by a rotatable crystal to form a beam of monochromatic neutrons. After having been defined by a collimator, the beam of monochromatic neutrons is reflected by another crystal which is movably disposed in the shield block through an exit hole in the shield block. In order to selectively extract beams of monochromatic neutrons which are different in neutron wavelength, the first crystal is rotatably mounted and the second crystal is also rotatably mounted as well as being mounted for translational movement toward and away from the exit hole along a guide rail.

NEUTRON MONOCHROMATOR

This invention relates to a neutron monochromator for selectively forming a beam of monochromatic neutrons variable in neutron wavelength.

In the conventional type of neutron monochromators, a beam exit hole has been arranged to be variable in its angular position relative to a beam entrance hole in accordance with a neutron wavelength of a beam to be extracted. This measure was disadvantageous in that a number of neutrons might leak through the region around the exit hole to the exterior. Alternatively, mechanism for rotating the exit hole with respect to the entrance hole was so complicated that it was technically difficult to construct.

Accordingly, it is an object of the present invention to eliminate the above-mentioned disadvantages.

It is another object of the present invention to provide a new and improved neutron monochromator simple in construction and including a beam exit passage disposed in a fixed angularly spaced relationship with respect to a beam entrance passage and which is not variable in its angular position relative to the beam entrance passage in accordance with a neutron wavelength of a beam of monochromatic neutrons to be extracted.

The invention accomplishes the above cited objects by the provision of a neutron monochromator comprising a stationary shield block including a hollow portion, an introduction passage for introducing a beam of neutrons into the hollow portion and an extraction passageway communicating with the hollow portion, and an irradiated member rotatably disposed in the hollow portion of the shield block, characterized by a reflector member movably disposed in the hollow portion of the shield block to direct a beam of neutrons reflected from the irradiated member toward the extraction passageway for extraction.

Preferably, guide rail means may be disposed in the hollow portion of the shield block extending toward the extraction passageway for moving the reflector member toward and away from the extraction passageway.

The invention will become more readily apparent from the following detailed description when taken in conjunction with the accompanying drawings in which.

Throughout several FIGS. like reference numerals designate the corresponding or similar components.

Figure 1:
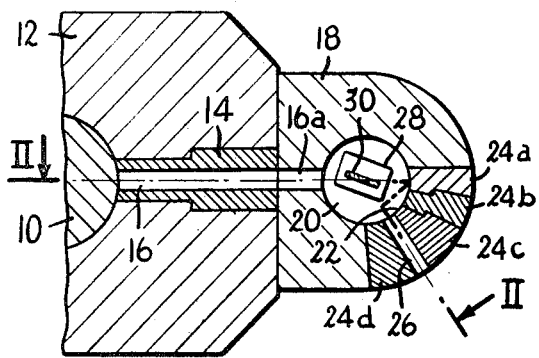
FIG. 1 is a horizontal sectional view of a neutron monochromator constructed in accordance with the principles of the prior art.
Figure 2:
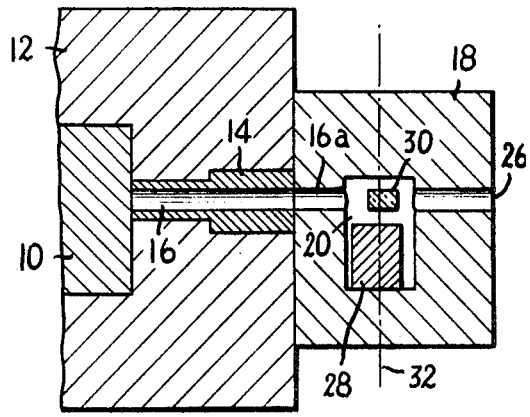
FIG. 2 is an elevational sectional view taken along the line II–II of FIG. 1.

Referring now to the drawings and FIGS. 1 and 2 in particular, there is illustrated one form of the conventional neutron monochromator. The arrangement illustrated comprises a nuclear reactor including a reactor core 10 and a reactor wall 12, and an experimental hole plug 14 snugly fitted into a hole extending through the reactor wall 12. A hole 16 longitudinally extends through the hole plug 14 to provide a neutron passageway through which a beam of neutrons from the reactor is adapted to pass. In order to prevent the beam of neutrons from being irradiated externally of the reactor wall 12, a stationary shield block 18 is attached to the reactor wall 12 and provided on that portion thereof adjacent the reactor wall with a hole or a narrow entrance passageway 16a aligned with the neutron passageway 16 providing an extension of the latter passageway. The stationary shield block 18 is further provided on its central portion with a cylindrical space 20 communicating with the hole 16a and on that portion thereof remote from the reactor wall 12 with a sectorial opening 22 communicating with the central space 20. The opening 22 is horizontally divergent in the outward direction until it opens into the atmosphere. A plurality of movable shield elements 24a, b, c and d are detachably and replaceably disposed in the sectorial opening 22 with their internal end faces defining a part of the central space 20. A selected one of the movable shield elements, in this case the end shield elements 24d, is separated away from the adjacent shield element 24c to define a radial narrow exit passage way 26 at the same level as the entrance passageway 16a for the purpose as will be apparent hereinafter.

Disposed in the central space 20 of the stationary shield block 18 is a rotatably table 28 on which is positioned a monochromator crystal 30 adapted to be irradiated with a beam of neutrons passed through the neutron and entrance passageways 16 and 16a, respectively. The crystal 30 reflects the beam of neutrons in the well-known manner. The table 28 can be rotated about an axis of rotation 32 (see FIG. 2) to change the angle formed between one of the main faces of the crystal 30 and the beam of neutrons incident upon that face. If the crystal 30 has its main or reflecting face disposed at a suitable angle to the central axis of the passageways 16 and 16a, it reflects the beam in the direction of the exit passageway 26 whereby the reflected beam can be extracted through the passageway 26.

The neutrons leaving the entrance passageway 16a and undergoing the first-order scattering by the crystal 30 have a neutron wavelength λ meeting the Bragg's condition. More specifically, assuming that $d_{hkl}$ represents a distance between adjacent lattice planes parallel to a crystallographic plane $hkl$ of a crystal involved and $\theta$ represents an angle formed between the crystallographic plane and a direction of a beam of neutrons incident upon that plane, the above-mentioned wavelength λ is expressed by the equation $$\lambda = 2 d_{hkl} \sin \theta$$

In order to continuously change a wavelength of monochromatic neutrons while a single crystallographic plane of the same crystal is used, it is necessary to continuously change the angle $\theta$ appearing on the right-hand side of the above equation. This is inevitably accompanied by a continuous change in angle formed between a direction in which the beam of neutrons is incident upon the crystal and a direction in which the resulting monochromatic neutrons leave the crystal, that is to say, an angle formed between the entrance passageway 16a and the exit passageway 26.

From the standpoint of the irradiation shielding, it is undesirable to extend a part from which the beam of neutrons is taken out or the mouth of the opening 26 throughout an angular range over which the angle between the entrance and exit passageways 16a and 26 is variable. For this reason, a plurality of movable shield elements 24a, b, c and d are inserted into the opening 22 thereby to shield the device except for an exit through which the monochromatic neutrons traveling at an angle of $\pi - 2\theta$ to the entrance passageway 16a is extracted, that is to say, for the exit passageway 26 where $\theta$ has the same meaning as in the previous case.

The conventional device as above described was disadvantageous in that as the movable shield means are divided into several portions, in this case, four shield portions 24a, b, c and d, a number of neutrons would leak externally through any clearance which might be formed between any pair of abutting movable shield elements. Upon changing an angular position of the exit passageway 26 relative to the entrance passageway 16a, the movable shield elements 24a, b, c and d must be rearranged or replaced. This is not only troublesome but also disadvantageous in that with a collimator disposed in the exit passageway 26 to define the divergence of the beam of monochromatic neutrons, the rearrangement of movable shield elements is accompanied by the removal of the collimator from the passageway 26 and the reinsertion of the latter into a newly formed exit passageway. Also upon changing the angle of λ−2θ as previously described, the adjustment of the exit passageway 26 is accomplished through the manual rearrangement of the movable shield elements 24a, b, c and d. Accordingly, the conventional device illustrated in FIGS. 1 and 2 was disadvantageous in that there was not conducted any unattended continuous measurement for a longtime such as a measurement conducted with a beam of monochromatic neutrons varied in neutron wavelength.

Figure 3:
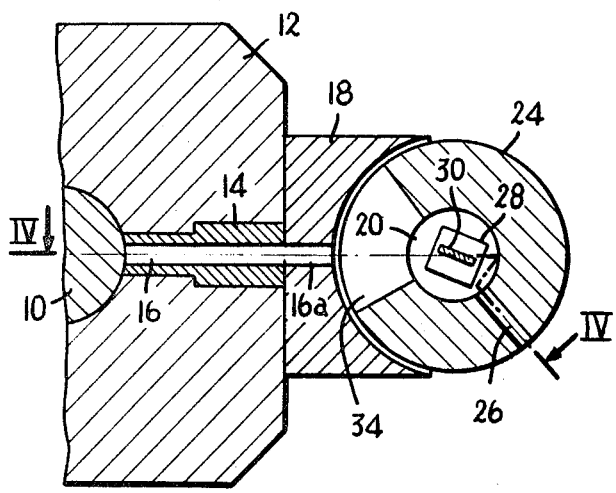
FIG. 3 is a view similar to FIG. 1 but illustrating another form of the conventional neutron monochromators.
Figure 4:
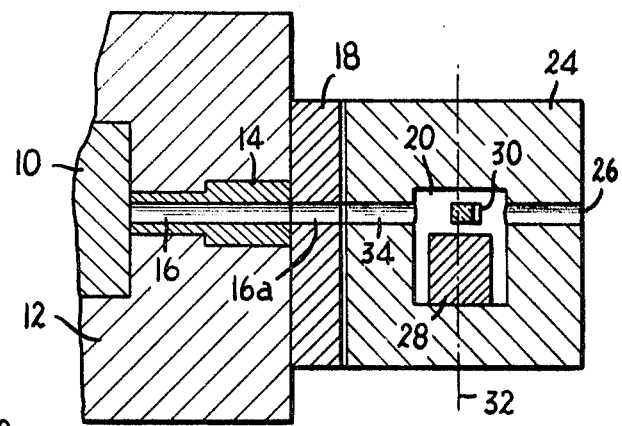
FIG. 4 is an elevational sectional view taken along the line IV–IV of FIG. 3.

In order to avoid these disadvantages, it has been previously proposed a neutron monochromator as shown in FIGS. 3 and 4 which will be subsequently described.

An arrangement illustrated in FIGS. 3 and 4 is substantially similar to that shown in FIGS. 1 and 2 except for the construction of the shield assembly. The shield assembly comprises a stationary shield block 18 having a flat surface attached to a reactor wall 12 and the opposite surface in the form of a concave cylindrical segment and a rotatable shield block 24 rotatably mounted in close contact with the concave surface of the stationary shield block 18. As in the previous arrangement, the stationary shield bloc 18 has a passageway 16a aligned with a passageway 16 extending through an experimental hole plug 14. The rotatable shield block 24 is provided with a central space 20, a radial exit or extraction passageway 26 communicating with both the central space 20 and the atmosphere, and a sectorial opening 34 communicating with the central space 20 and horizontally divergent toward the stationary shield block 18. The passageway 34 is always closed by the concave cylindrical surface of the stationary shield block 18.

The rotatable shield block 24 can be rotated about an axis of rotation 32 (see FIG. 4) to change an angle formed between a beam of neutrons incident upon a reflection face of a monochromator crystal 30 on a table 28 and that reflection face whereby the resulting beam of monochromatic neutrons can be extracted through the exit passageway 26. In other words, the rotation of the rotatable shield block 24 results in the adjustment of an angle formed between the entrance passageway 16a and the exit passageway 26.

The exit passageway 26 is fixed with respect to the rotatable shield block 24 in contrast with the arrangement illustrated in FIGS. 1 and 2. This eliminates the necessity of moving a collimator disposed in the exit passageway 26 upon angularly displacing the latter with respect to the entrance passageway 16a. Also, the sectorial passageway 34 is always closed by the stationary shield block 18 and not exposed directly to the atmosphere. Further, the neutrons scattered from the crystal 30 or the rotatable shield block 24 is larger in number for the forward scattering than for the back scattering. Therefore it is concluded that the neutron leakage will be less from the arrangement illustrated in FIGS. 3 and 4 than from that illustrated in FIGS. 1 and 2.

However the arrangement illustrated in FIGS. 3 and 4 was disadvantageous in that the many neutrons could leak through longitudinal and transverse clearances which might be formed between the stationary and rotatable shield blocks 18 and 24, respectively, and that a mechanism for rotating the rotatable shield block was technically difficult to construct because the latter had a weight of several tons. The present invention contemplates to eliminate the disadvantages as above described in conjunction with FIGS. 1 through 4.

Figure 5:
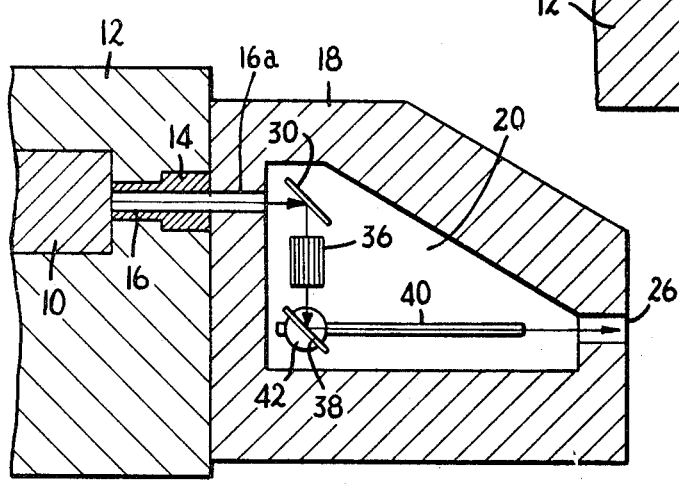
FIG. 5 is an elevational sectional view of a neutron monochromator constructed in accordance with the principles of the invention.

Referring now to FIG. 5, there is illustrated a neutron monochromator constructed in accordance with the principles of the invention. As in the arrangement shown in FIGS. 1 and 2, a stationary shield block 18 is attached to a reactor wall 12 and provided on that portion thereof adjacent the reactor wall with a hole or a narrow entrance passageway 16a aligned with a neutron passageway 16 extending through the reactor wall 12 providing an extension of the latter. The shield block 18 further includes a central space 20 communicating with the entrance passageway 16a and also with the atmosphere through a narrow exit passageway 26 bored on that portion remote from the reactor wall 12 and coplanar with the entrance passageway 16a.

Rotatably disposed within the central space 20 of the stationary shield block 18 is a monochromator crystal 30 positioned to reflect a beam of neutrons passed from the associated reactor 10 through the passageways 16 and 16a to form a beam of monochromatic neutrons. In order to define the divergence of the beam of monochromatic neutrons, a neutron collimator 36 is disposed below the crystal 30 so as to be movable in a direction in which the beam of monochromatic neutrons from the crystal 30 travels by any suitable means (not shown). The collimator 36 serves to permit only the beam of monochromatic neutrons to pass therethrough but removes the remaining undesired neutrons. The beam of monochromatic neutrons emerging from the collimator 36 is then reflected by a rotatable reflector crystal 38 into the exit passageway 26 until the same is extracted through it.

As previously described, an angle formed between the common longitudinal axis of the passageways 16 and 16a and the reflecting plane of the crystal 30 can vary to change the neutron wavelength of the monochromatic beam. It is apparent that in order to extract from the stationary exit passageway 26 a beam of monochromatic neutrons thus varied in neutron wavelength, this change in angle is necessarily accompanied by a change in the position of the collimator 36 relative to the monochromator crystal 30 and accordingly the rotation and displacement of the reflector crystal 38. To this end, a guide rail 40 extends toward the exit passageway 26 and is aligned with the latter and has movable secured thereon a rotatable disc 42 to which the reflector crystal 38 is rigidly mounted. A suitable mechanism (not shown) is used to displace the disc 42 and therefore the crystal 38 along the rail 40 while rotating the same about the center of the disc.

Figure 6:
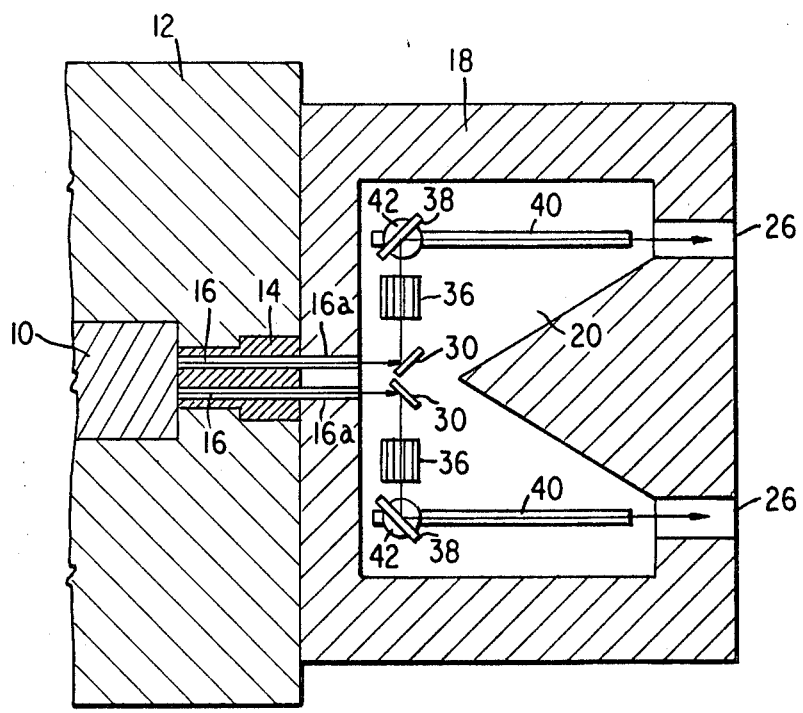
FIG. 6 is a view similar to FIG. 5 but showing a modification of the present invention.

FIG. 6 discloses a second embodiment of the present invention wherein two monochromator crystals 30 are disposed one above the other. Each crystal 30 is aligned with a single beam passageway 16 as well as being coupled to a reflector crystal 38. A pair of guide rails extend in aligned relationship toward respective ones of the exit passageways 26. In operation, a pair of beams of neutrons are emitted from the pair of parallel passageways 16, 16a and are reflected in opposite directions from the monochromator crystals 30. The reflected beams travel through the respective exit passageways 26 in a manner similar to that described with reference to FIG. 5.

Thus it will be appreciated that the present neutron monochromator includes, in addition to a monochromator crystal for effecting the Bragg's reflection of neutrons to form a particular mean of monochromatic neutrons in the well-known manner, the reflector crystal serving to reflect again the beam of monochromatic neutrons so as to direct it toward the exit passageway 26 which is fixedly oriented. This measure permits beams of monochromatic neutrons different in neutron wavelength to be selectively extracted only through the provision of the beam extraction passageway 26 extending through the stationary shield block 18 and having a cross-sectional dimension as small as substantially equal to a cross-sectional dimension of a beam of monochromatic neutrons to be extracted. Also, because of no clearance between the stationary shield block and the adjacent reactor wall, the shielding of neutrons is completely accomplished. In addition, the invention can provide a simple construction small in floor space resulting in a great decrease in manufacturing costs.

While the description has been made in terms of a beam of monochromatic neutrons resulting from the first order reflection, it will be understood that the beam of monochromatic neutrons reflected from the monochromator crystal 30 includes also beam portions resulting from the higher order reflections, such as the second and third reflections. These higher order reflections meet the general Bragg's condition $$n\lambda = 2d_{hkl} \sin \theta$$

where $n$ is an integer greater than 1. As well known, a reflectivity for any of the higher order reflection for example a reflectivity $R_n$ for the $n$th order reflection is smaller than that reflectivity $R_1$ for the first order reflection. That is, the following relation is held $$1 > R_1 > R_n.$$

Since the neutrons are reflected from each of the monochromator and reflector crystals 30 and 38, respectively, which makes two reflections, the respective numbers of the neutrons after having been reflected in the first and $n$th orders from the reflector crystal will be proportional to $R_1^2$ and $R_n^2$. Under these circumstances it can be expected that the inequality $1 >> R_{nn}^2$ is held. This permits any desired beam of monochromatic neutrons to minimize its contamination with dissimilar neutrons.

With the present neutron monochromator operatively coupled to a neutron diffractometer, there is eliminated the necessity of movably disposing the associated goniometer. This permits the associated magnet, cryostat and furnace to be disposed on a floor on which the monochromator is disposed, rather than on the goniometer resulting in a simplification of the construction of the goniometer.

While the invention has been illustrated and described in conjunction with a single preferred embodiment thereof, it is to be understood that numerous changes in the details of construction and the combination and arrangement of parts may be resorted to without departing from the spirit and scope of the invention.

We claim:

1. In a neutron monochromator, the combination of a stationary shield block including means defining a hollow portion, an introduction passageway for introducing a beam of neutrons into said hollow portion, and an extraction passageway communicating with said hollow portion, an irradiated member rotatably disposed in said hollow portion and positioned to be irradiated with a beam of neutrons passing through said introduction passageway; and a reflector member movably disposed in said hollow portion of said shield block to direct a beam of neutrons reflected from said irradiated member toward said extraction passage for extraction.

2. A neutron monochromator as claimed in claim 1, comprising guide rail means disposed in said hollow portion of said shield block for moving said reflector member.

3. In a neutron monochromator, the combination of a stationary shield block including means defining a hollow portion, a single introduction passageway for introducing a beam of neutrons into said hollow portion and a plurality of extraction passageways communicating with said hollow portion; a plurality of irradiated members rotatably disposed in said hollow portion of said shield block and positioned to be irradiated with a beam of neutrons passing through said introduction passageway; one reflector member rotatably disposed in said hollow portion of said shield block to direct a beam of neutrons reflected from each of said irradiated members toward a different one of said extraction passageways for extraction.

4. A neutron monochromator as claimed in claim 3 comprising one guide rail means for each of said reflector members disposed in said hollow portion of said shield block for moving the associated reflector member.